UNITED STATES PATENT OFFICE.

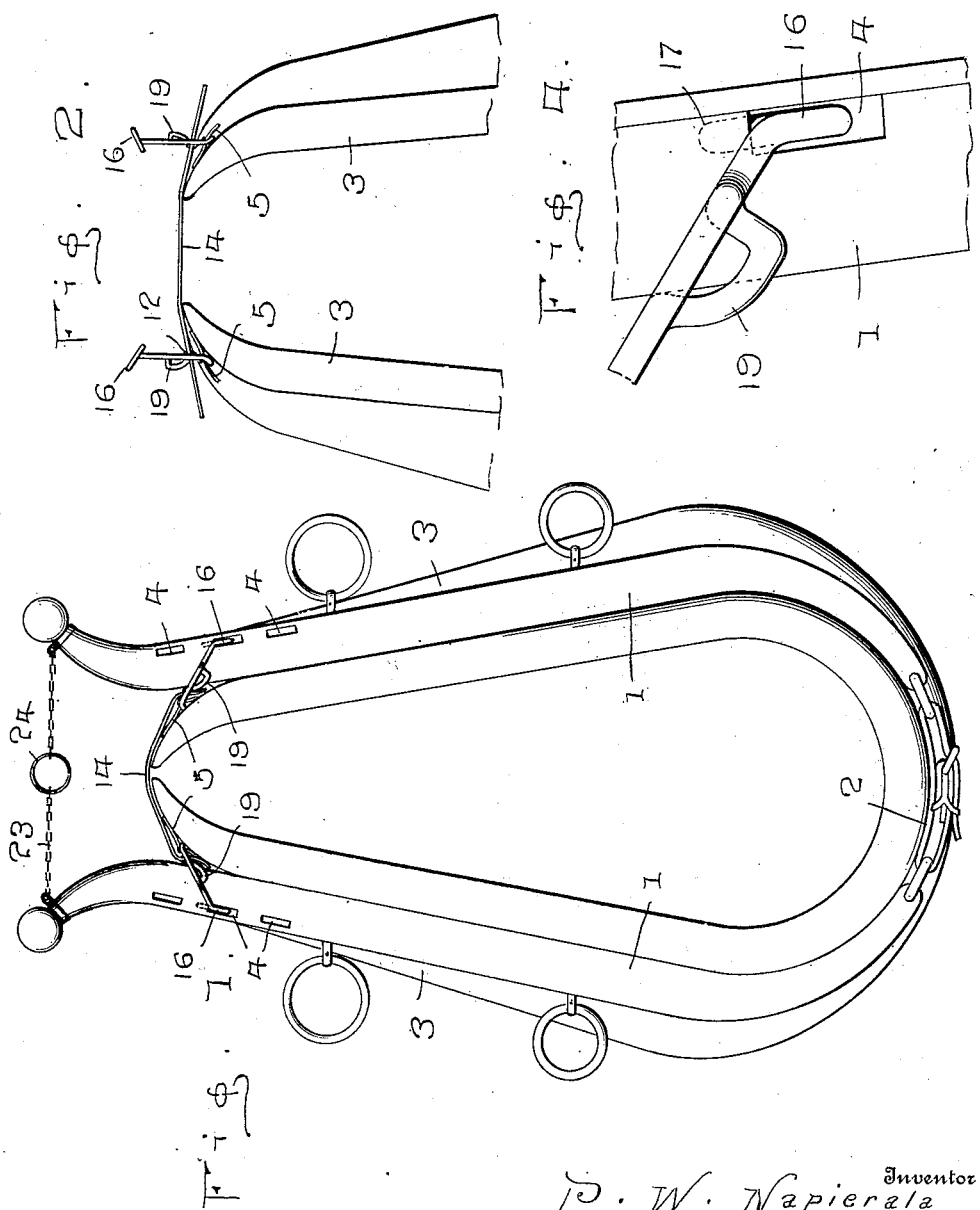

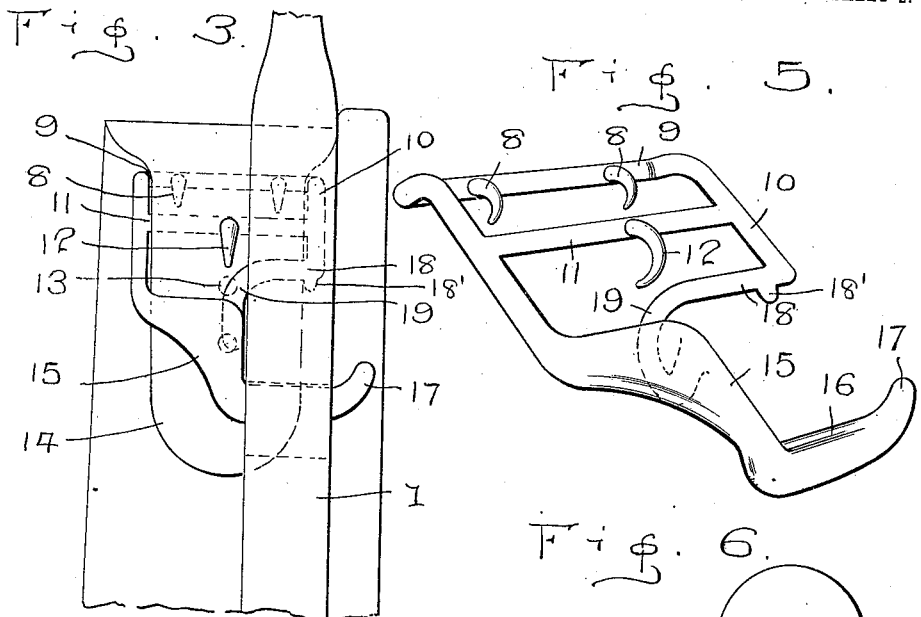
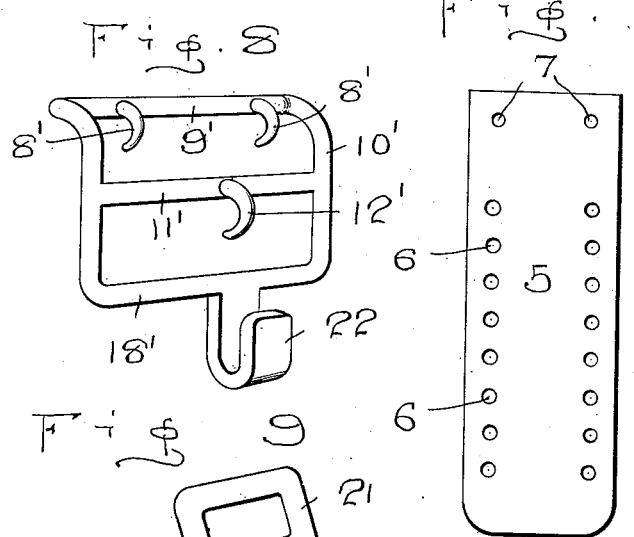
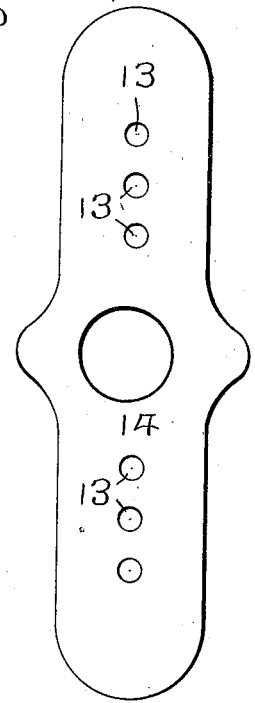

PAUL W. NAPIERALA, OF CHICAGO, ILLINOIS.

HAME-FASTENER.

No. 925,497.  Specification of Letters Patent.  Patented June 22, 1909.

Application filed September 1, 1908.  Serial No. 451,214.

*To all whom it may concern:*

Be it known that I, PAUL W. NAPIERALA, a citizen of the United States, residing at Chicago, in the county of Cook and State of Illinois, have invented certain new and useful Improvements in Hame-Fasteners; and I do hereby declare the following to be a full, clear, and exact description of the invention, such as will enable others skilled in the art to which it appertains to make and use the same.

This invention relates to new and useful improvements in hame fasteners and is an improvement on the device disclosed in Patent #899,890 granted Sept. 29th, 1908.

It is an object of the invention to provide a novel device of this character wherein pinching or other injury to the neck of an animal is reduced to a minimum.

It is a further object of the invention to provide a device of this character wherein an adjustment may be obtained to readily permit a collar being employed on different sized animals.

The invention also has for an object to provide a novel device of this character wherein the fasteners for the top of the hames are secured to the hames and to the collar in order to provide means whereby the greater the pull on the hame strap at the base of the hames, the less liability there will be to injury to the upper portion of the neck of the animal. This object is attained by the fact that the connection of the fastener to the hames and to the collar will cause the meeting ends of the collar to separate.

It is also an object of the invention to employ in conjunction with the fastener novel buckles, said buckles being so constructed as to be engaged by the hames and held by said hames against lateral displacement.

It is furthermore an object of the invention to provide a novel device of this character that will be simple in construction, efficient and advantageous in practice and comparatively inexpensive to manufacture.

With the above and other objects in view the invention consists of the details of construction and in the novel arrangement and combination of parts to be hereinafter referred to.

In describing the invention in detail reference will be had to the accompanying drawings forming part of this specification wherein like characters of reference denote corresponding parts in the several views, in which, Figure 1 is a view in elevation of a collar with the invention applied thereto. Fig. 2 is a fragmentary view of a top of a collar with the hames omitted showing a position attained by the collar when in condition to be applied or removed from the animal. Fig. 3 is a fragmentary view in side elevation of the invention. Fig. 4 is a fragmentary view in side elevation showing the means of securing a buckle to a hame. Fig. 5 is a view in perspective of a buckle employed with the invention. Figs. 6 and 7 illustrate in plan certain details of the invention. Fig. 8 is a view in perspective of a modified form of buckle to be employed in conjunction with a low hame, and, Fig. 9 is a view in perspective of an end portion of a low hame employed with the buckle of Fig. 8.

In the drawings 1 denotes the hames which may be of the usual or any preferred construction secured together at their lower ends by the hame strap 2 as is well known.

3 denotes a collar to which the hames are to be secured, said collar being separated at its upper end so that the collar may be readily moved apart to permit the collar being applied or taken from the neck of an animal.

The upper ends of the hames 1 are provided with a plurality of transverse openings 4 arranged adjacent the outer edge thereof.

Secured to the collar 3 adjacent the separated ends thereof and on the top surface of the collar are the straps 5, said straps being provided with a plurality of openings 6 adjacent each longitudinal edge. The straps 5 are secured to the collar by any suitable fastening means passing through openings 7 in one end thereof. For the detail of this strap 5 attention is directed to Fig. 7.

Through transversely opposed openings 6 pass inwardly projecting hooks 8 carried by a cross-bar 9 of a buckle 10. By this form of strap 5 it will be readily seen that the buckle 10 can be adjusted with relation to the collar to compensate for animals of various sizes. Extending across the buckle, substantially at the axial center of the same and parallel with the bar 9 is a second cross-bar 11 at the longitudinal center of which is formed a curved tongue 12 which is adapted to pass through one of a series of perforations 13 in a bridge strap 14 which extends across the separated ends of the collar and limits the outward movement thereof as is fully shown in Fig. 2. By providing this strap with a plurality of openings 13 it is readily apparent how the movement or separation of the ends of the collar may be controlled. The end of the buckle opposite to the cross-bar 9 is bent to form a stem 15 which is provided at its outer end with a lateral extension 16. The free end 17 of the extension 16 is curved upwardly and offset with relation to the extension 16 to form a locking member whereby the buckle will be retained by the hame. The extension 16 is intended to pass through one of the openings 4 and the offset 17 thereof will prevent its casual displacement while the hame is in operative position.

It is to be noted at this time that providing the hames 1 with a plurality of openings 4 the buckles can be adjusted vertically with relation to the hames.

The end of the buckle opposite to the cross-bar 8 and to one side of the stem 9 is provided with a bar 18 having an angular depending portion 19 into which rests the hames, as is more particularly shown in Fig. 4. This arrangement is most advantageous as the hame effectually holds the buckles against lateral displacement.

To apply or remove the collar the hame strap 2 is unfastened which permits the hames 1 being swung outwardly sufficient to permit the passage of the extension 16 of the buckles 10 through the openings 4. After the buckles have been released from the hames they are moved upwardly as shown in Fig. 2, which movement will permit the ends of the collar 3 to separate when the collar can be easily passed over the head of the animal.

In Figs. 8 and 9 is illustrated a means whereby the buckle may be employed in conjunction with a low hame. The upper end of the low hame 20 is provided with an eye 21. This eye is engaged by a hook 22 depending centrally from a cross-bar $18^1$ on the buckle $10^1$. This buckle is further provided with the intermediate bar $11^1$ from which projects the hook $12^1$. The buckle also has the cross-bar $9^1$ provided with the hooks $8^1$. The hooks $8^1$ and $12^1$ together with the buckle $10^1$ serve in the same capacity as described with reference to the form of buckle shown in Fig. 5.

Attention is directed to the fact that in order to prevent the hames from turning or slipping forward and backward a projection 18' is formed on the bar 18 adjacent its outer end as is fully shown in Figs. 3 and 5, said projection 18' contacting with the hames 1.

It has also been found well in practice that the upper ends of the hames 1 be connected by a chain 23 which has interposed centrally thereof the ring 24 through which a rein may be passed should the animals be worked in tandem.

What I claim is:

1. In combination with a collar, hames therefor, buckles pivotally held by the collar, means carried by the buckles for engaging the hames and holding the hames to the collar, and means whereby the hames hold the buckles against lateral displacement.

2. In a hame attachment the combination with a collar having separated ends; of hames therefor, buckles adjustably and pivotally secured to the collar adjacent its separated ends, means to adjustably attach the hames to the buckles and additional means adjustably secured to the buckles and extended over the separated ends of the collar.

3. In a hame attachment, the combination with a collar having separated ends; of hames therefor, straps secured to the collar adjacent the separated ends, said straps having a plurality of openings therein, buckles having means thereon to engage the openings in the straps, means on the buckle to engage and support said hames and additional means extending over the severed ends of the collar and into engagement with the buckle.

4. In a hame attachment, the combination with a collar having separated ends; of hames for said collar, said hames having a plurality of openings adjacent their upper ends, buckles adjustably secured to the collar, lateral extensions on said buckles adapted to engage the openings in the hames and support the hames on the collar and means at the free ends of the extensions to prevent casual removal of the hames.

In testimony whereof I have signed my name to this specification in the presence of two subscribing witnesses.

PAUL W. NAPIERALA.

Witnesses:
  HENRY D. DONAHOE.
  JAMES HARTNETT.